DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 19, 1972

905 O.G. 454

T905,013
FIBER-PROCESSING PROCEDURE
Robert H. Welsh, Wellesley Hills, and Joseph M. Onorato, Westwood, Mass., assignors to Eastman Kodak Company
Filed June 2, 1972, Ser. No. 259,197
Int. Cl. D06p *5/04*
U.S. Cl. 8—173
No Drawing. 21 Pages Specification

A procedure for reliably processing synthetic fibers, e.g. polyester fibers to reduce the flammability thereof. A class of ethoxylated aliphatic alcohols, e.g. tridecyl alcohol condensed with 8 ethylene oxide groups, are particularly useful when used as cleaning agents in an aqueous bath.